United States Patent [19]
Hirose et al.

[11] Patent Number: 5,088,319
[45] Date of Patent: Feb. 18, 1992

[54] STEERING ANGLE SENSOR

[75] Inventors: Hisashi Hirose; Kazuo Kouno, both of Aichi, Japan

[73] Assignee: Kabushiki Kaisha Tokai Rika Denki Seisakusho, Aichi, Japan

[21] Appl. No.: 633,537

[22] Filed: Dec. 28, 1990

[30] Foreign Application Priority Data

Dec. 29, 1989 [JP] Japan ............................ 1-152879[U]

[51] Int. Cl.$^5$ ............................................. G01M 19/00
[52] U.S. Cl. ......................................................... 73/118.1
[58] Field of Search ...................... 73/118.1; 180/79.1; 338/67

[56] References Cited

U.S. PATENT DOCUMENTS 4,940,107 7/1990 Hanisko ........................ 180/79.1 X
4,967,865 11/1990 Schindler ........................ 180/79.1

Primary Examiner—Jerry W. Myracle
Attorney, Agent, or Firm—Finnegan, Henderson, Farabow, Garrett, and Dunner

[57] ABSTRACT

A steering angle sensor including a case body having a through hole for a steering shaft. The case body is adapted to be fixed to a vehicle body. A cover is attached to an end portion of the case body and a printed board having a flat resistor element is provided at the end portion of the case body. A hollow rotor for passing the steering shaft therethrough is rotatably supported by the case body and the cover, and the hollow rotor has a positioning portion for positioning the steering shaft. A contactor is mounted on the rotor within the cover and disposed in sliding contact with the resistor element of the printed board. A spring is interposed between the steering shaft and the rotor to apply a resilient force thereto. The resistor element has a degree of variation of a sensor output voltage in a first range of steering angles, in straight running of a vehicle, larger than that in a range of steering angles exceeding the first range.

14 Claims, 3 Drawing Sheets

STEERING ANGLE SENSOR

BACKGROUND OF THE INVENTION

This invention relates generally to a steering angle sensor of the resistance type, and more particularly to a steering angle sensor that improves sensing precision during straight running of a vehicle, and that can be attached to a steering shaft in an improved manner.

A conventional steering angle sensor (hereinafter referred to as "sensor") has an output voltage that linearly varies with the steering angle over the entire sensing range. Driving stability during high-speed running, in which the steering angle is typically in the range of approximately ±20°, requires a high sensing precision.

In the conventional sensor, output voltage variation corresponding to a steering angle variation is low in the range ±20°. Thus, the conventional sensor has been unable to provide sufficient sensing precision during high-speed running of a vehicle.

SUMMARY OF THE INVENTION

It is an object of the present invention to provide a steering angle sensor that provides enhanced sensing precision.

To achieve this object according to one aspect of the present invention a steering angle sensor for use in a vehicle having a steering shaft, comprises a case body, adapted for coupling to a vehicle body and for accommodating the shaft; a hollow rotor, rotatably supported by the case body and adapted for coupling around the circumference of the steering shaft, including a positioning portion for positioning the steering shaft; a printed board, provided in the case body; and a contactor, coupled to the rotor and in sliding contact with the resistor means. The printed board includes flat longitudinal resistor means including a middle portion having a first resistivity and 2 end portions each having a resistivity lower than the first resistivity.

According to another aspect of the present invention a steering angle sensor for use in a vehicle having a steering shaft, comprises a case body, adapted for coupling to a vehicle body and for accommodating the shaft; a hollow rotor, rotatably supported by the case body and the cover, adapted for coupling around the circumference of the steering shaft, including a positioning portion for positioning the steering shaft; means, interposed between the steering shaft and the rotor, for applying a resilient force between the steering shaft and the rotor; a printed board, provided in the case body, including flat longitudinal resistor means; and a contactor, coupled to the rotor and in sliding contact with the resistor means.

The accompanying drawings, which are incorporated in and which constitute a part of this specification, illustrate one embodiment of the invention and, together with the description, explain the principles of the invention.

DESCRIPTION OF THE PREFERRED EMBODIMENT OF THE INVENTION

The preferred embodiment of the invention will now be described with reference to the drawings.

In the preferred embodiment, a steering shaft is fitted in a rotor of the sensor attached to the vehicle body and aligned with a positioning portion. A spring is interposed between the rotor and the steering shaft to eliminate a backlash between the two. The positioning portion is related to a position of electrical contact in the sensor, thereby allowing the neutral steering position to be conveniently synchronized with the midpoint of the sensor, that is, a straight running of the vehicle corresponds to a zero steering angle.

When the steering shaft rotates, the rotor rotates to vary the portion of contact between a contactor and the resistor element, thereby generating a voltage corresponding to the steering angle. The variation of the sensor output during straight running of the vehicle, where the steering angle is in the range ±20°, is relatively large, thereby enhancing sensitivity.

Figure 1:
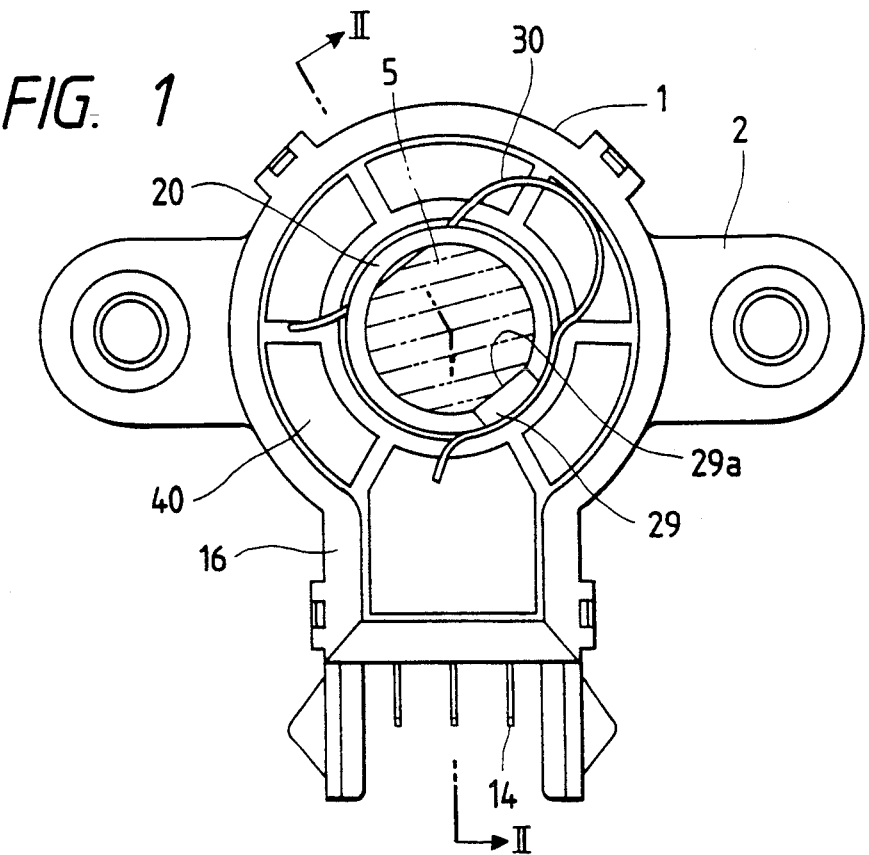
FIG. 1 is a plan view of a steering angle sensor according to the preferred embodiment of the present invention.

FIG. 1 is a general view of the steering angle sensor of the preferred embodiment. Case body 1 is fixedly mounted on a vehicle body by brackets 2. A cover 40 has a central portion through which a rotor 20 extends. A steering shaft 5 extends through rotor 20, and a spring 30 connects steering shaft 5 to rotor 20. A projection 29 on rotor 20 contains a flat surface 29a that facilitates synchronization of the neutral steering position with the electrical mid-point of the sensor.

A connector 16 is an integral part of a side of case body 1. Terminals 14 for connecting to an external electric circuit are mounted on connector 16.

Figure 2:
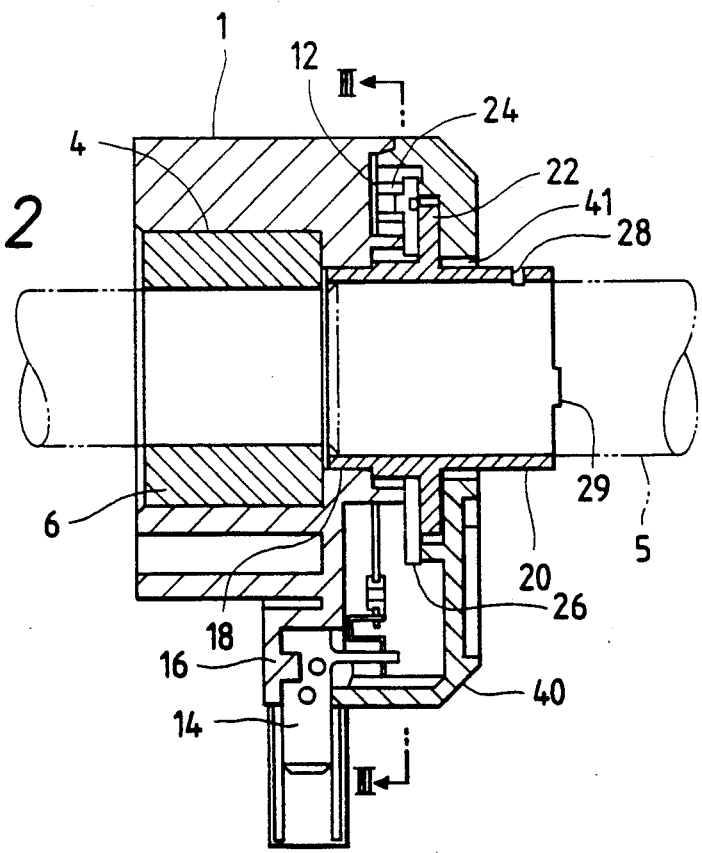
FIG. 2 is a cross-sectional view taken along the line II—II of FIG. 1.

FIG. 2 is a cross sectional view taken along the line II-II of FIG. 1. Rotor 20 is a hollow tubular member in which steering shaft 5 is fitted. A front end portion of rotor 20 is rotatable supported in a journal hole 18 in case body 1, and a disk-like flange 22 is an integral part of the outer peripheral surface of rotor 20 intermediate the opposite ends of rotor 20. A bearing 6 is mounted in a bearing-mounting hole 4 of case body 1, and bearing 6 is fitted on and bears steering shaft 5 intermediate opposite ends of steering shaft 5. A plate 26 is fixedly mounted on one side of flange 22 facing case body 1, thereby integrally connecting plate 26 to rotor 20. A contactor 24 disposed in sliding contact with a printed board 12 is mounted on plate 26.

When rotor 20 is attached to case body 1, plate 26 abuts inner annular projecting wall 8.

The end portion of rotor 20 defines a slit 28 through which steering shaft 5 is inserted. Slit 28 extends in the direction of the circumference of rotor 20. Spring 30 (shown in FIG. 1) for eliminating a backlash between steering shaft 5 and rotor 20, is inserted in slit 28.

Projection 29 is on the end portion of rotor 20 from which the steering shaft 5 is to be inserted, and projection 29 has a flat surface 29a which interrupts parts of the circumference of the inner surface of motor 20. Portions of slit 28 and flat surface 29a are related to a position of contact between contactor 24 and printed board 12, such that upon attachment of steering shaft 5 the neutral steering position coincides with an electrically midpoint of the sensor.

Cover 40 has a hole 41 at its central portion through which rotor 20 extends, and its outer peripheral portion 42 is fitted in outer annular projecting wall 10 of case body 1.

Figure 4:
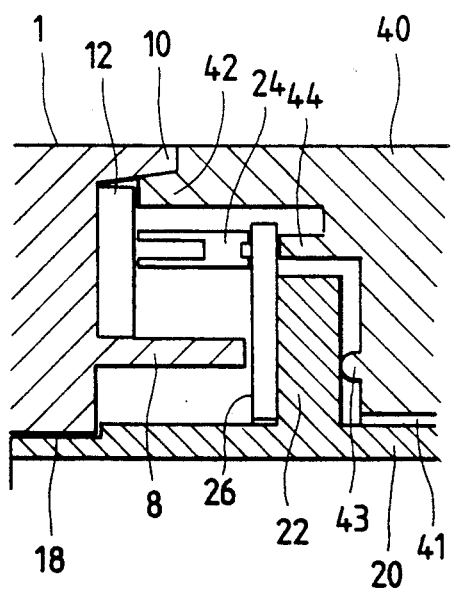
FIG. 4 is a fragmentary, enlarged view of the sensor.

FIG. 4 is an enlarged portion of FIG. 2. An inner annular projecting wall 8 is on an end of the case and is disposed close to a journal hole 18, and an outer annular projecting wall 10 is on the case end at the outer peripheral edge thereof. Annular printed board 12 is mounted between the two projecting walls 8 and 10. An inner annular projection 43 for sliding contact with flange 22 of rotor 20 is on the inner surface of cover 40, and is disposed close to hole 41. An outer annular projection 44 for sliding contact with plate 26 is on the inner surface of the cover 40, and is disposed outwardly of flange 22.

When cover 40 is attached to case body 1, the front end portion of rotor 20 is fitted in case body 1, and flange 22 and plate 26 are rotatably supported by inner annular projecting wall 8 of case body 1 and inner and outer annular projections 43 and 44 of cover 40.

Next, the attachment of the sensor to the vehicle body will now be described.

The sensor is attached to the vehicle body by fixing case body 1 to the vehicle body. Steering shaft 5 is then inserted with a cut portion of steering shaft 5 disposed in registry with flat surface 29a of the rotor end and slit 28. Subsequently, spring 30 is inserted into slit 28 to integrally connect steering shaft 5 and rotor 20. Since spring 30 holds steering shaft 5 by its resilient force, a backlash between steering shaft 5 and rotor 20 is absorbed, allowing the operator to maintain a grip on the steering. Thus, over the long term, the sensor output indicates different values, depending precisely on the direction of rotation of the steering, without slippage or hysteresis.

Figure 3:
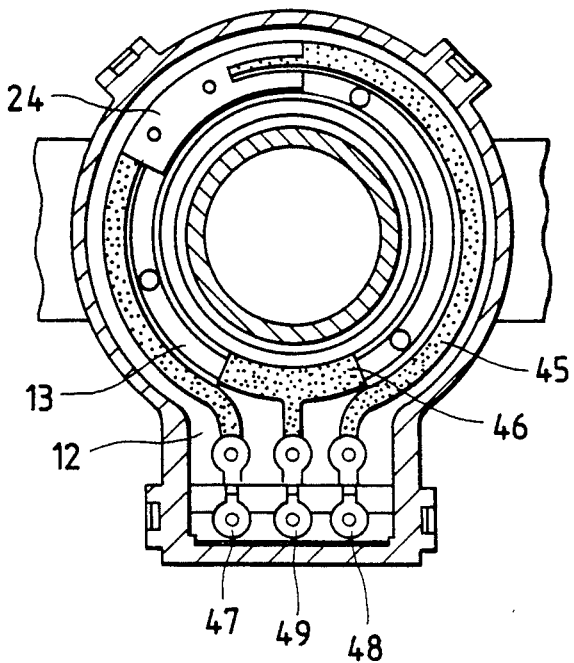
FIG. 3 is a plan view taken along the line III—III of FIG. 2.

FIG. 3 is a plan view taken along the line III—III of FIG. 2. A flat resistor element 45 and a protective resistor element 46 are on the side of printed board 12 with which contactor 24 is slidingly contacted. Resistor element 45 has a resistance characteristic that generates an output voltage corresponding to the steering rotation angle. Protective resistor element 46 prevents over-current to the resistor element resulting from eddy current developing when a wiring harness on the vehicle is short-circuited. Resistor element 45 is connected to terminals 47 and 48. Contactor 24 is connected to a terminal 49 via protective resistor element 46. Reference numeral 13 denotes a conductor.

Normally, if the wiring harness on the vehicle were to be short-circuited when the sensor output is near its maximum value, eddy currents would flow through the resistor element between the contactor and the power terminal, thus subjecting the resistor element to possible over-current To prevent this, the neutral portion of the steering is set at the position of contactor 24 shown in FIG. 3, and protective resistor element 46 is provided at the position which is symmetrical relative to the above position of the contactor 24 and is obtained when rotating the steering through 180°. Thus, if the wiring harness on the vehicle is short-circuited when the sensor output is near its maximum value, current flows as indicated by an arrow in FIG. 6. In this case, the current flows through protective resistor element 46 and therefore will not form eddy current, thus preventing over-current to resistor member 45.

Figure 6:
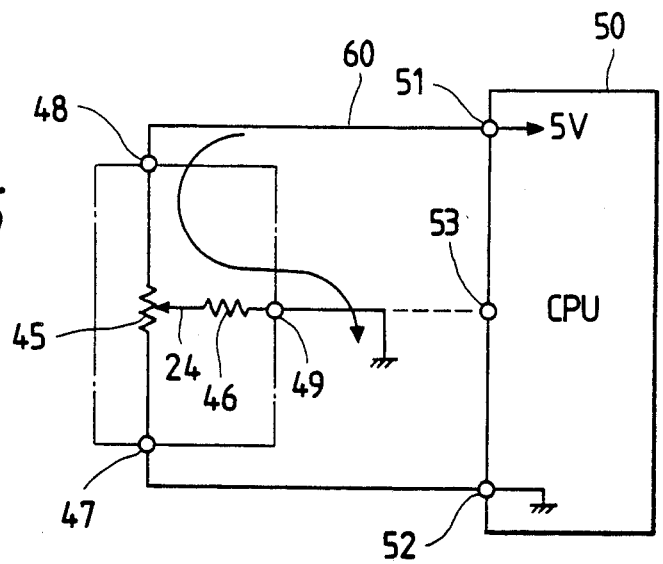
FIG. 6 is a wiring diagram of the sensor.

FIG. 6 is a schematic wiring diagram of the sensor. The sensor and a CPU 50 are connected together via wiring harness 60 on the vehicle. A power terminal 48 is connected to a power terminal 51 of CPU 50, an earth terminal 47 is connected to an earth terminal 52 of CPU 50, and a contactor terminal 49 is connected to a sensor input terminal 53 of the CPU.

Figure 5:
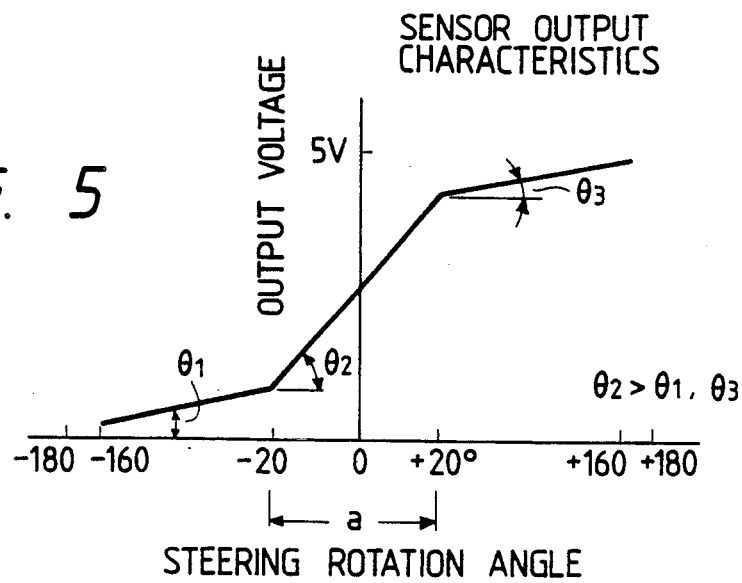
FIG. 5 is an illustration of sensor output characteristics.

Resistor element 45 is formed by first printing a resistor film of a uniform resistivity over the entire circumference extending between the terminals 47 and 48, and then by further printing a resistor film in such a manner that the resistivity of resistor element 45, within a region covering the range of ±20°, is increased. As shown in FIG. 5, the resistivity is relatively large within the steering angle range of ±20°, so that the degree of variation of the output voltage corresponding to a variation in steering angle is increased in that range, thereby enhancing sensitivity within the range ±20°.

In other words resistor element 45 has a resistivity in a middle portion that is higher than a resistivity in either of two end portions, and the middle portion has a length such that the contactor contacts the middle portion when the steering angle is within the range ±20 and contacts one of the end portions when the steering angle is outside of the range ±20. With these resistivity characteristics, a slight amount of the steering rotation can be sensed during high-speed straight running, and based on the output voltage at this time, control during high-speed running tends to have enhanced stability.

In contrast, in the range greater than ±20 and less than ±160 the resistivity is relatively small so that the degree of variation of the output voltage corresponding a variation in the steering angle is decreased, thereby reducing the sensitivity in that range.

As described above, in the preferred embodiment of the present invention, the degree of variation of the sensor output voltage corresponding to the steering angle during straight running of the vehicle is set to a large value, and therefore a slight amount of the steering operation in straight running of the vehicle can be sensed with an enhanced precision.

Further, since the rotor of the sensor has a portion for positioning relative to the steering shaft, the neutral steering position can be easily synchronized to the zero point of the sensor.

Further, because of the spring between the rotor and the steering shaft, a backlash between these two members is eliminated, and the direction of rotation of the steering can be sensed without hysteresis effects.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept, and it is intended that the present invention cover modifications and variations provided they come within the scope of the appended claims and their equivalents.

WHAT IS CLAIMED IS:

1. A steering angle sensor for use in a vehicle having a steering shaft, comprising:
   a case body, adapted for coupling to a vehicle body and for accommodating the shaft;
   a hollow rotor, rotatably supported by the case body and adapted for coupling around the circumference of the steering shaft, including a positioning portion for positioning the steering shaft;
   a printed board, provided in the case body, including flat longitudinal resistor means including a middle portion having a first resistivity and 2 end portions each having a resistivity lower than the first resistivity; and a contactor, coupled to the rotor and in sliding contact with the resistor means.

2. A steering angle sensor according to claim 1, further for use in a vehicle having a wiring harness, further including a protective resistor element, coupled to the contactor, and having a resistance sufficient to prevent burning damage to the resistor means at a time when over-current is generated by short-circuiting a wiring harness to the vehicle.

3. The steering angle sensor according to claim 1, wherein the middle portion of the resistor means has a length such that the contactor contacts the middle portion of the resistor means when the steering angle is within the range ±20° and of the end portions of the resistor means when the steering angle is outside of the range ±20°.

4. A steering angle sensor for use in a vehicle having a steering shaft, comprising:

a case body, adapted for coupling to a vehicle body and for accommodating the shaft;

a hollow rotor, rotatably supported by the case body and the cover, adapted for coupling around the circumference of the steering shaft, including a positioning portion for positioning the steering shaft;

means, interposed between the steering shaft and the rotor, for applying a resilient force between the steering shaft and the rotor;

a printed board, provided in the case body, including flat longitudinal resistor means; and a contactor, coupled to the rotor and in sliding contact with the resistor means.

5. A steering angle sensor for use in a vehicle having a steering shaft, comprising:

a case body, adapted for coupling to a vehicle body and for accommodating the shaft, defining a hole and having an end portion;

a cover, coupled to the end portion of the case body, defining a hole in alignment with the hole of the case body;

a hollow rotor, rotatably supported by the case body and the cover, adapted for coupling around the circumference of the steering shaft, including a positioning portion for positioning the steering shaft;

means, interposed between the steering shaft and the rotor, for applying a resilient force between the steering shaft and the rotor;

a printed board, provided in the case body, including flat longitudinal resistor means including a middle portion having a first resistivity and 2 end portions each having a resistivity lower than the first resistivity; and a contactor, coupled to the rotor within the cover, and in sliding contact with the resistor means.

6. The steering angle sensor according to claim 5, wherein the middle portion of the resistor means has a length such that the contactor contacts the middle portion of the resistor means when the steering angle is within the range ±20° and contacts one of the end portions of the resistor means when the steering angle is outside of the range ±20°.

7. A steering angle sensor according to claim 5, further for use in a vehicle having a wiring harness, further including a protective resistor element, coupled to the contactor, and having a resistance sufficient to prevent burning damage to the resistor means at a time when over-current is generated by short-circuiting a wiring harness to the vehicle.

8. A vehicle comprising:

a vehicle body;

a steering shaft;

a case body, coupled to the vehicle body and accommodating the shaft;

a hollow rotor, rotatably supported by the case body and coupled around the circumference of the steering shaft, including a positioning portion for positioning the steering shaft;

a printed board, provided in the case body, including flat longitudinal resistor means including a middle portion having a first resistivity and 2 end portions each having a resistivity lower than the first resistivity; and a contactor, coupled to the rotor and in sliding contact with the resistor means.

9. The vehicle according to claim 8, further including a wiring harness; and a protective resistor element, coupled to the contactor, and having a resistance sufficient to prevent burning damage to the resistor means at a time when current is generated by short-circuiting a wiring harness to the vehicle.

10. The vehicle according to claim 8, wherein the middle portion of the resistor means has a length such that the contactor contacts the middle portion of the resistor means when the steering angle is within the range ±20° and contacts one of the end portions of the resistor means when the steering angle is outside of the range ±20°.

11. A vehicle comprising:

a vehicle body;

a steering shaft;

a case body, coupled to the vehicle body and accommodating the shaft;

a hollow rotor, rotatably supported by the case body and the cover, coupled around the circumference of the steering shaft, including a positioning portion for positioning the steering shaft;

means, interposed between the steering shaft and the rotor, for applying a resilient force between the steering shaft and the rotor;

a printed board, provided in the case body, including flat longitudinal resistor means; and a contactor, coupled to the rotor and in sliding contact with the resistor means.

12. A vehicle comprising:

a vehicle body;

a steering shaft;

a case body, coupled to the vehicle body and accommodating the shaft, defining a hole and having an end portion;

a cover, coupled to the end portion o the case body, defining a hole in alignment with the hole of the case body;

a hollow rotor, rotatably supported by the case body and the cover, coupled around the circumference of the steering shaft, including a positioning portion for positioning the steering shaft;

means, interposed between the steering shaft and the rotor, for applying a resilient force between the steering shaft and the rotor;

a printed board, provided in the case body, including flat longitudinal resistor means including a middle portion having a first resistivity and 2 end portions each having a resistivity lower than the first resistivity; and a contactor, coupled to the rotor within the cover, and in sliding contact with the resistor means.

13. The vehicle according to claim 12, wherein the middle portion of the resistor means has a length such that the contactor contacts the middle portion of the resistor means when the steering angle is within the range ±20° and contacts one of the end portions of the resistor means when the steering angle is outside of the range 35°.

14. A vehicle according too claim 12, further including a wiring harness;

a protective resistor element, coupled to the contactor, and having a resistance sufficient to prevent burning damage to the resistor means at a time when current is generated by short-circuiting a wiring harness to the vehicle.

* * * * *

UNITED STATES PATENT AND TRADEMARK OFFICE
CERTIFICATE OF CORRECTION

PATENT NO. : 5,088,319

DATED : February 18, 1992

INVENTOR(S) : Hisashi Hirose et al.

It is certified that error appears in the above-identified patent and that said Letters Patent is hereby corrected as shown below:

Claim 3, column 5, line 19, after "and" insert --contacts one--.

Claim 12, column 6, line 62, after "portion" change "o" to --of--.

Claim 13, column 8, line 4, change "35°" to -- $\pm 20°$ --

Claim 14, column 8, line 5, change "too" to --to--.

Signed and Sealed this

Fourteenth Day of September, 1993

BRUCE LEHMAN

Attest:

Attesting Officer

Commissioner of Patents and Trademarks